United States Patent
Gallagher et al.

(10) Patent No.: US 8,266,317 B2
(45) Date of Patent: Sep. 11, 2012

(54) REDUCING IDLE TIME DUE TO ACKNOWLEDGEMENT PACKET DELAY

(75) Inventors: James R. Gallagher, Austin, TX (US); Binh K. Hua, Austin, TX (US); Hong L. Hua, Austin, TX (US); Wen Xiong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/131,167

(22) Filed: Jun. 2, 2008

(65) Prior Publication Data

US 2009/0300211 A1 Dec. 3, 2009

(51) Int. Cl.
*G06F 15/16* (2006.01)

(52) U.S. Cl. .......................... 709/233; 709/235; 710/118

(58) Field of Classification Search .................. 709/233, 709/235; 716/6; 710/118
See application file for complete search history.

(56) References Cited

U.S. PATENT DOCUMENTS

| | | | |
|---|---|---|---|
| 4,769,815 A * | 9/1988 | Hinch et al. | 370/236 |
| 4,914,650 A * | 4/1990 | Sriram | 370/235 |
| 6,219,713 B1 | 4/2001 | Ruutu et al. | |
| 6,570,848 B1 | 5/2003 | Loughran et al. | |
| 6,594,701 B1 | 7/2003 | Forin | |
| 7,065,581 B2 | 6/2006 | Dierks, Jr. et al. | |
| 7,161,978 B2 | 1/2007 | Lu et al. | |
| 7,530,089 B1 * | 5/2009 | Hayes et al. | 725/95 |
| 7,656,800 B2 * | 2/2010 | Morandin | 370/235 |
| 2003/0194968 A1 * | 10/2003 | Young | 455/45 |
| 2005/0063302 A1 * | 3/2005 | Samuels et al. | 370/229 |
| 2007/0076754 A1 * | 4/2007 | Krishnaswamy | 370/468 |
| 2008/0298240 A1 * | 12/2008 | Lee et al. | 370/235 |

* cited by examiner

*Primary Examiner* — David Lazaro
*Assistant Examiner* — Marie Georges Henry
(74) *Attorney, Agent, or Firm* — Stephen J. Walder, Jr.; Steven L. Bennett

(57) ABSTRACT

Mechanisms for reducing the idle time of a computing device due to delays in transmitting/receiving acknowledgement packets are provided. A first data amount corresponding to a window size for a communication connection is determined. A second data amount, in excess of the first data amount, which may be transmitted with the first data amount, is calculated. The first and second data amounts are then transmitted from the sender to the receiver. The first data amount is provided to the receiver in a receive buffer of the receiver. The second data amount is maintained in a switch port buffer of a switch port without being provided to the receive buffer. The second data amount is transmitted from the switch port buffer to the receive buffer in response to the switch port detecting an acknowledgement packet from the receiver.

24 Claims, 4 Drawing Sheets

| TIME | SERVER | SWITCH PORT | CLIENT |
|---|---|---|---|
| T0 | 0KB | 0KB | 0KB |
| T1 | 4KB | 0KB | 0KB |
| T2 | 4KB | 4KB | 0KB |
| T3 | 4KB | 4KB | 4KB |
| T4 | 4KB | 4KB | 8KB |
| T5 | 4KB | 4KB | 12KB |
| ... | ... | ... | ... |
| ... | ... | ... | ... |
| T32 | 4KB | 4KB | 120KB |
| T33 | 4KB | 4KB | 124KB |
| T34 | 4KB | 4KB | 128KB |
| T35 | 0KB | 8KB | 0KB |
| T36 | 0KB | 8KB | 0KB ←ACK |
| T37 | 4KB | 4KB ←ACK | 4KB |
| T38 | 4KB | 4KB | 8KB |
| ... | ... | ... | ... |
| ... | ... | ... | ... |

*FIG. 4*

REDUCING IDLE TIME DUE TO ACKNOWLEDGEMENT PACKET DELAY

BACKGROUND OF THE INVENTION

1. Field of the Invention

The present application relates generally to an improved data processing apparatus and method and more specifically to mechanisms for reducing idle time due to acknowledgement packet delay.

2. Background of the Invention

Transmission Control Protocol (TCP) and Internet Protocol (IP) are the primary protocols used for large scale interconnectivity of computing devices in the world today. TCP provides reliable, in-order delivery of a stream of bytes, making it suitable for applications like file transfer and e-mail. IP is a data-oriented network layer protocol used for communicating data across a packet-switched internetwork. As a lower layer protocol, IP provides the service of communicable unique global addressing amongst computers whereas TCP is the transport protocol that manages the individual conversations between computers, e.g., web servers and web clients. TCP divides the messages into smaller pieces and is also responsible for controlling the size and rate at which messages are exchanged between the computers. Together, TCP and IP are often referred to as the TCP/IP protocol suite.

As described in the CISCO Systems Internetworking Technology Handbook, (available at www.cisco.com/en/US/docs/internetworking/technology/handbook/Internet-Protocols.html#wp1156) TCP/IP uses a sliding window mechanism to control the data flow between the two computers (sender and receiver) in a TCP/IP connection. A TCP sliding window provides efficient use of network bandwidth because it enables computers to send multiple bytes or packets before waiting for an acknowledgment packet.

In TCP, the receiver computer specifies the current window size in every packet. Because TCP provides a byte-stream connection, window sizes are expressed in bytes. This means that a window is the number of data bytes that the sender computer is allowed to send before waiting for an acknowledgment packet from the receiver computer. Initial window sizes are indicated at connection setup, but might vary throughout the data transfer to provide flow control. A window size of zero, for instance, means "Send no data."

In a TCP sliding-window operation, for example, the sender computer may have a sequence of bytes to send (numbered 1 to 10) to a receiver computer who has a window size of five. The sender computer may then place a window around the first five bytes and transmit them together. The sender computer may then wait for an acknowledgment packet to be returned by the receiver computer indicating that more data may be sent.

The receiver computer may respond with an ACK=6, indicating that it has received bytes 1 to 5 and is expecting byte 6 next. In the same packet, the receiver computer may indicate that its window size is 5. The sender computer may then move the sliding window five bytes to the right and transmit bytes 6 to 10. The receiver computer may respond with an ACK=11, indicating that it is expecting sequenced byte 11 next. In this packet, the receiver computer might indicate that its window size is 0 (because, for example, its internal buffers are full). At this point, the sender computer cannot send any more bytes until the receiver computer sends another packet with a window size greater than 0.

Thus, with the sliding-window operation, the flow of data between the sender and receiver computers is paused many times to make sure that the receiver has enough resources for handling the incoming data. If the receiver computer cannot quickly process the TCP/IP receive buffers, the TCP/IP window may become full and, as a result, the sender computer will stop the sending of data and wait for an acknowledgement packet with a window size greater than 0.

BRIEF SUMMARY OF THE INVENTION

In one illustrative embodiment, a method, in a data processing system, is provided for communicating data between a sender computing device and a receiver computing device. The method may comprise determining a first amount of data corresponding to a window size for a communication connection between the sender computing device and the receiver computing device. The method may further comprise calculating a second amount of data in excess of the first amount of data that may be transmitted with the first amount of data from the sender computing device to the receiver computing device. Moreover, the method may comprise transmitting the first amount of data and second amount of data from the sender computing device to the receiver computing device. The first amount of data may be provided to the receiver computing device in at least one receive buffer of the receiver computing device. The second amount of data may be maintained in at least one switch port buffer of a switch port without being provided to the at least one receive buffer of the receiver computing device.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is an exemplary diagram illustrating a timing of data transmissions in accordance with one illustrative embodiment;

DETAILED DESCRIPTION OF THE INVENTION

As discussed above, when a Transmission Control Protocol (TCP)/Internet Protocol (IP) window becomes full, the sender computer must wait for an acknowledgement packet indicating a window size greater than zero before it can send additional data to the receiver computer. Thus, the time period that the sender computer waits represents a delay in the transmission of data from the sender computer to the receiver computer. Add to this delay, the additional delay due to latency in the actual transmission via the one or more data networks, and the amount of delay in processing a portion of data transmitted between the sender computer and the receiver computer may be significant. During this delay period, the sender computer is essentially idle with regard to the TCP/IP connection and is not performing useful work but merely waiting for an opportunity to transmit additional data.

The illustrative embodiments provide mechanisms for reducing the idle time experienced by a sender computer due to delays in receiving acknowledgement packets from a receiver computer. The mechanisms of the illustrative embodiments use buffers associated with TCP/IP receiver link partner switch ports to buffer additional data to be provided to the receiver virtually immediately upon detection that the receiver computer is transmitting an acknowledgement packet back to the sender computer. This allows the sender computer to send an additional amount of data greater than the window size indicated by the receiver computer which may be stored in the receiver link partner switch port buffers when the sender computer is transmitting data. When the receiver computer transmits an acknowledgement packet, this data is immediately released to the receiver computer's TCP/IP receive buffers while the acknowledgement packet is being routed to the sender computer. The sender computer may then transmit additional data in response to the receiving the acknowledgement packet but meanwhile, the data released to the TCP/IP receive buffers of the receiver computer is being processed by the receiver computer. With proper sizing of the additional data transmitted by the sender computer in excess of the window size, the streaming of data to the receiver computer may be virtually continuous from the view of the receiver computer. From the sender computer view, the transmission of data may be virtually continuous since the sender computer is sending the additional portion of data to be stored in the TCP/IP receiver link partner switch port buffers at approximately a same time as the receiver computer is processing the window of data received in the receiver's TCP/IP receive buffers. This greatly reduces the idle time experienced by the sender computer due to waiting for an acknowledgement packet before continuing transmission of data.

Figure 1:
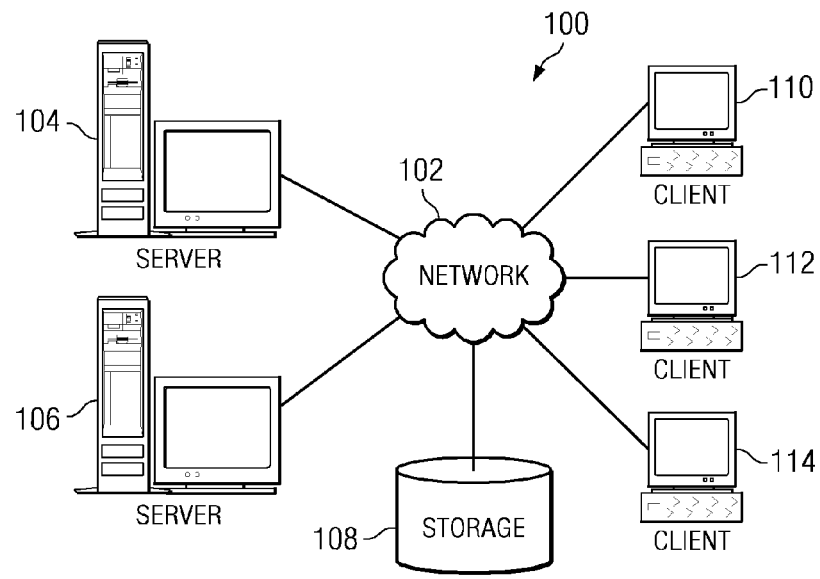
FIG. 1 is an exemplary block diagram of a distributed data processing system in which exemplary aspects of the illustrative embodiments may be implemented.
Figure 2:
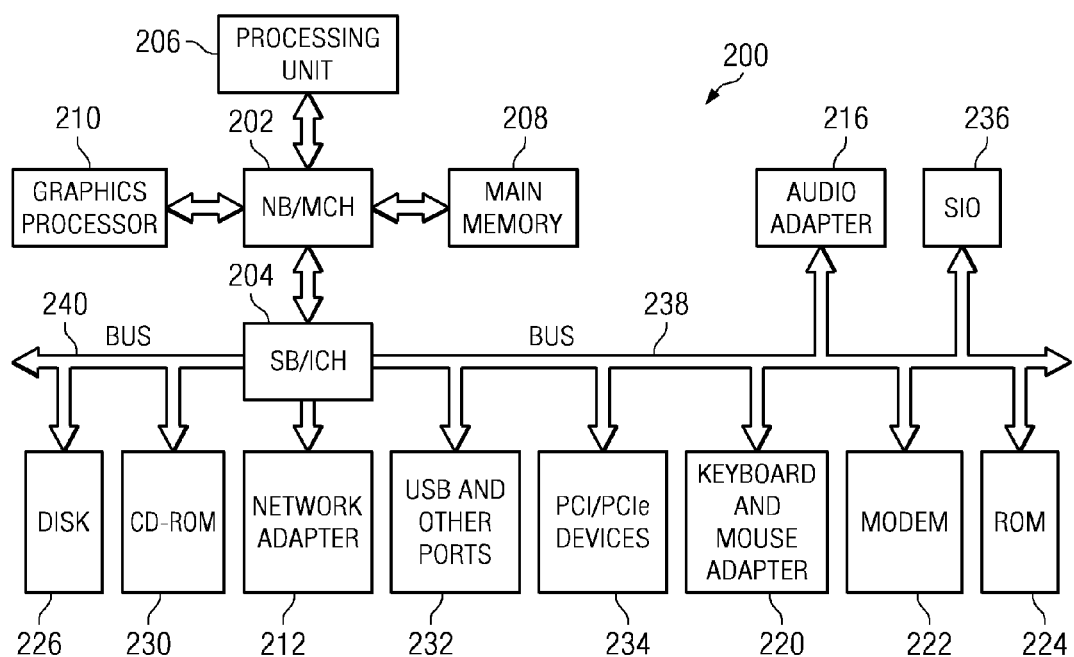
FIG. 2 is an exemplary block diagram of a computing device in which exemplary aspects of the illustrative embodiments may be implemented.

The illustrative embodiments are especially well suited for implementation in a distributed data processing environment, such as a local area network, wide area network, the Internet, or the like. In order to provide a context for the description of the specific elements and functionality of the illustrative embodiments, FIGS. 1 and 2 are provided hereafter as exemplary environments in which exemplary aspects of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, assume that one computing device in the distributed data processing environment 100 needs to communicate data to another computing device by way of a transmission protocol. For example, the server computing device 106 may need to transmit data to the client computing device 110. For purposes of the description of the illustrative embodiments herein, it will be assumed that the data network 102 is the Internet and the Transmission Control Protocol (TCP)/Internet Protocol (IP) suite is being used to control the transmission of data along network connections between the two computing devices 106 and 110. It should be appreciated, however, that the mechanisms of the illustrative embodiments may be used with other types of protocols, either now known or later developed, that make use of a sliding-window approach to controlling data flow between computing devices.

When a connection is established between the sender computing device, e.g., server computing device 106, and the receiver computing device, e.g., client computing device 110, the sender computing device calculates a latency between the sender computing device and the receiver computing device. The calculation of a latency may take many different forms including, for example, sending a request and measuring a delay time between the sending of the request and receipt of a corresponding response from the receiver computing device. For example, the server computing device 106 may "ping" the client computing device 110 by sending an Internet Control Message Protocol (ICMP) "echo request" packet to the client computing device 110 and listening for an ICMP "echo response" reply packet. This "ping" measures the round-trip time of the request.

The determined latency is then used to calculate an amount of data in excess of the TCP/IP window size that may be transmitted by the server computing device 106 to the client computing device 110. The calculation may be performed using one or more equations, formulas, lookup table data structures, or any other mechanism that may represent a relationship between latency and an amount of data that may be transmitted. The server or client can send a 1 byte ping packet to determine the latency of the TCP/IP connection between the server computing device 106 and the client computing device 110.

For example, it may take 10 ms for the 1 byte ping packet to take a round trip. Therefore, the network latency between the server and the client may be determined to be approximately 10 ms. In a 10 Gbit/second network, the client computing device 110 can receive approximately 8 KB/ms (The network speed is 10 Gbit per second and thus, in 1 ms, the network can transmit 10 KB. However, system input/output (I/O) buses, such as PCIe busses, have to perform 10 to 8 bit decoding. Therefore, 10 KB is actually only 8 KB of real data). In such a case, the server computing device 106 may send 8 KB more than the TCP/IP window size. If the TCP/IP window size is 128 KB, then the server computing device 106 may transmit 136 KB (128 KB+8 KB) before it receives the acknowledgement packet back from the client computing device 110. In this example, when the client computing device 110 sends data out to the server computing device 106, it takes 5 ms for the first packet of data to reach the server 106 due to network latency.

Receiver link switch port logic, associated with the receiver computing device, i.e. client computing device 110, monitors the TCP/IP window size and the acknowledgement packet being sent from the client computing device 110 to the server computing device 106. The receiver link switch port logic may be provided in a network switch device, such as an Ethernet switch having multiple switch ports for connection to multiple computing devices, or the like. In one illustrative embodiment, the network switch device is a separate hardware device from the computing devices, i.e. client computing device 110 and server computing device 106, but is coupled to these computing devices so as to provide a communication pathway between the two computing devices. In another illustrative embodiment, the network switch may be integrated with one of the computing devices. The receiver link switch port logic is associated with a switch port in the network switch to which the receiver computing device, i.e. client computing device 110, is coupled. The receiver link switch port logic may be implemented in hardware, software, or any combination of hardware and software.

Based on the monitoring performed by the receiver link switch port logic, the switch port logic stops forwarding data when the TCP/IP window is full, e.g., 128 KB, have been provided to the TCP/IP receive buffers of the client computing device 110, and resumes forwarding data when it sees an acknowledgement packet. The additional amount of data transmitted by the server computing device 106, e.g., the additional 8 KB, is stored in one or more buffers associated with the receiver link switch port. In this way, when the TCP/IP window is full, the server computing device continues to send the additional data before it pauses and waits for the acknowledgement packet, however this additional data is not forwarded to the TCP/IP receive buffers of the client computing device 110 until an acknowledgement packet is returned by the client computing device 110.

The additional data stored in the one or more buffers of the receiver link switch port is virtually immediately released in response to the transmitting of the acknowledgement packet without delay. This additional data stored in the one or more buffers of the receiver link switch port keeps the client computing device 110 busy while the next portion of data is being transmitted by the server computing device 106 such that there is minimal delay/idle time for the receiver computing device, e.g., client computing device 110, after the acknowledgement packet is transmitted. Moreover, since the sender computing device, e.g., server computing device 106, transmits more data than is present in the TCP/IP window, with the additional data being sent at approximately a same time as the receiver computing device is processing the TCP/IP window data, the amount of delay between pausing transmission of data and receipt of an acknowledgement packet from the receiver computing device is minimized.

Figure 3:
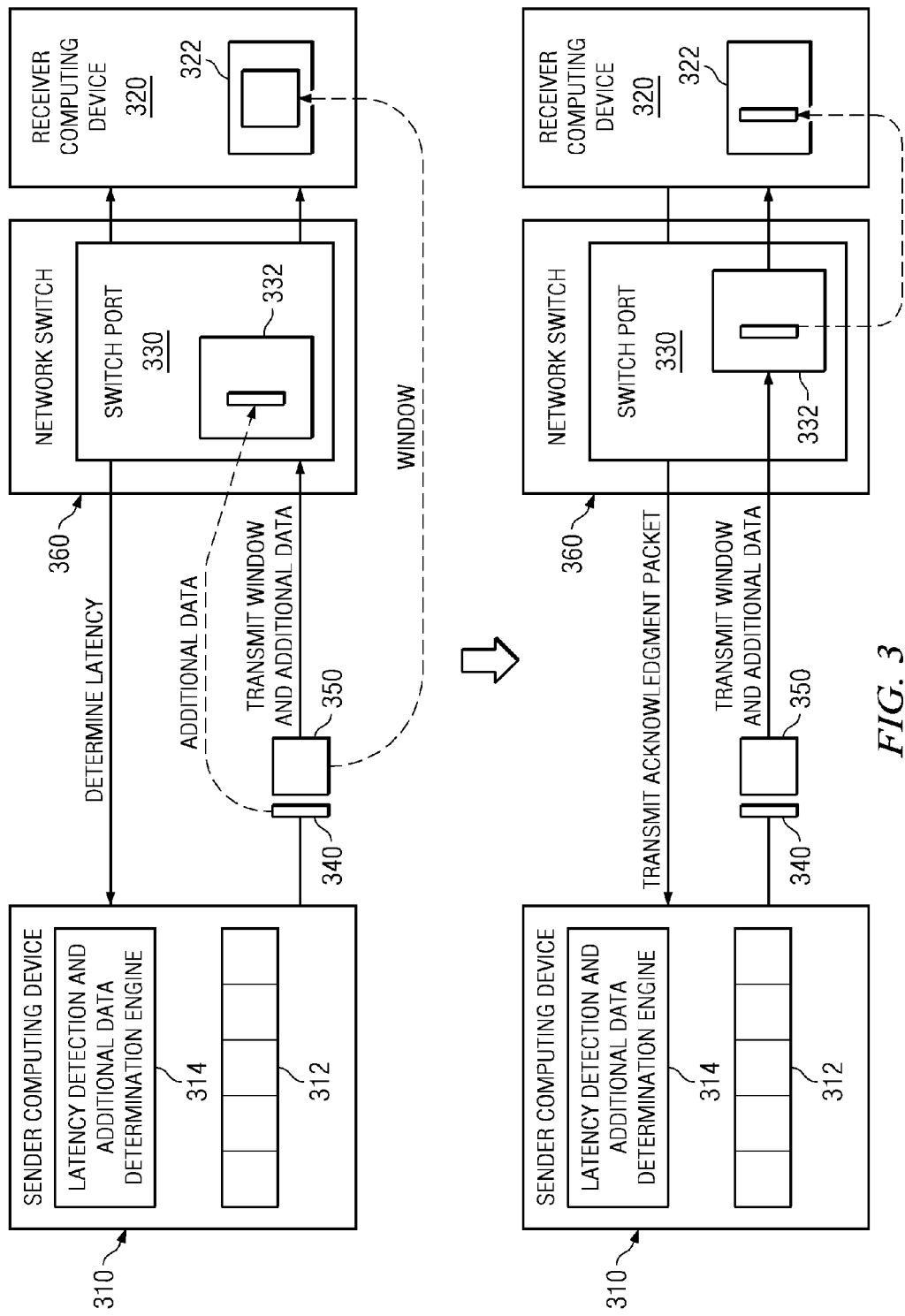
FIG. 3 is an exemplary diagram illustrating an operation of the primary operational components of one illustrative embodiment.

FIG. 3 is an exemplary diagram illustrating an operation of the primary operational components of one illustrative embodiment. As shown in FIG. 3, when a sender computing device 310 needs to transmit data to a receiver computing device 320, the sender computing device 310 and receiver computing device 320 negotiate a connection between the two computing devices. As part of the creation of this connection, the receiver computing device 320 informs the sender computing device 310 of the window size for transmitting data from the sender computing device 310 to the receiver computing device 320, such as by setting a value in a window size field of a TCP packet, for example. In addition, the sender computing device 310 determines a latency of the connection between the computing devices 310 and 320 using the latency detection and additional data determination (LDADD) engine 314. The LDADD engine 314 has logic, provided either as hardware, software, or any combination of hardware and software, for determining the latency of the connection, such as based on a "ping" operation, looking at timestamps of requests and corresponding replies, or the like, and calculating an amount of additional data that may be transmitted in excess of the specified window size. For example, the calculation may involve determining, based on the network delay determined from the ping operation, and a known transmission bandwidth of the network connections, e.g., 10 Gb/s, a determination of how much additional data may be sent may be made.

Having determined the window size and the amount of additional data that may be transmitted in excess of the window size, the sender computing device 310 transmits a first portion of data 350 corresponding to the window size, and a second portion of data 340 corresponding to the amount of additional data, from the transmit buffers 312 to the receiver computing device 320 via one or more data networks. The data is received at the receiver computing device 320 via a switch port 330 of a network switch device 360 which passes the window of data 350 to the receive buffer(s) 322 of the receiver computing device 320. The switch port 330 of the network switch device 360 has logic, provided either as hardware, software, or any combination of hardware and software, that monitors the amount of data being provided to the receive buffer(s) 322, the current window size, and whether an acknowledgement packet has been transmitted by the receiver computing device 320. The switch port 330, as part of this monitoring, determines when the amount of data passed to the receive buffer(s) 322 equals the current window size and, in response to the amount of data equaling the current window size, stores the remaining data in one or more switch port buffers 332 without providing the data to the receive buffer(s) 322 of the receiver computing device 320.

Once the receiver computing device 320 has processed the data in the receive buffer(s) 322, the receiver computing device 320 generates an acknowledgement packet that it transmits back to the sender computing device 310. The acknowledgement packet is transmitted to the sender computing device 310 via the switch port 330. The logic in the switch port 330 monitors for this acknowledgement packet and, in response to detecting the transmission of this acknowledgement packet, the logic causes the additional data stored in the switch port buffer(s) 332 to be virtually immediately transferred to the receive buffer(s) 322 of the receiver computing device 320. Meanwhile the acknowledgement packet is transmitted to the sender computing device 310 which, in response to receiving the acknowledgement packet, transmits the next window of data and additional portion of data to the receiver computing device 320.

Thus, while the sender computing device 310 is transmitting the next window of data, the receiver computing device 320 is processing the additional portion of data 340 previously sent with the previous window of data. By the time that this additional portion of data 340 is processed by the receiver computing device 320, the next window of data is received in the receiver computing device 320. Thus, the amount of delay between sending of an acknowledgement packet and processing of a next portion of data in the receiver computing device 320 is minimized. Moreover, with proper sizing of the additional portion of data 340, the transmission of this additional portion of data 340 from the sender computing device 310 to the receiver computing device 320 may overlap, to a certain extent, the transmission of the acknowledgement packet from the receiver computing device 320 to the sender computing device 310. In this way, the amount of idle time of the sender computing device 310 waiting for an acknowledgement packet may be minimized.

It should be appreciated that FIG. 3 only shows transmission of data from the sender computing device to the receiver computing device. However, it should be appreciated that in typical communication connections, data is transferred both from the sender computing device to the receiver computing device and from the receiver computing device to the sender computing device. As such, with regard to one direction of data transmission, the sender computing device and receiver computing device may operate in the manner outlined above. However, in a second direction of data transmission, the receiver computing device may act as the sender computing device and the sender computing device may act as the receiver computing device. Thus, the mechanisms discussed above attributable to the sender computing device may actually be provided in both the sender and receiver computing devices in order to facilitate both directions of data transmission. Moreover, the mechanisms discussed above attributable to the receiver computing device may actually be provided in both the sender and receiver computing devices as well. In this way, both computing devices may act as sender and receiver with regard to data transmissions across the communication connection.

FIG. 4 is an exemplary diagram illustrating a timing of data transmissions in accordance with one illustrative embodiment. As shown in FIG. 4, at an initial time point, each of the elements, server, network switch, and client computing device have 0 KB in their respective buffers, e.g., a transmission buffer of the server, a switch buffer of the network switch, and a receive buffer of the client computing device. At a next time point, T1, the server receives a first 4 KB of data for transmission in its transmission buffer. At a time point T2, the 4 KB in the transmission buffer of the server are transmitted to the switch port's buffer and a next 4 KB are received in the transmission buffer of the server. At time point T3, the switch port forwards the first 4 KB to the client computing device's receive buffer. In addition, the switch port receives the next 4 KB from the server computing device and the server computing device receives a third 4 KB portion in its transmission buffer. This process continues for each of the subsequent time points where the amount of data accumulated in the client computing device's receive buffer increases by the 4 KB portions.

At a time point T33, the server computing device has sent the 128 KB window of data with 124 KB of the 128 KB having been received at the client and the remaining 4 KB being present in the network switch's buffer. Meanwhile, the server continues to transmit an additional amount of data in excess of the 128 KB window. Thus, in time point T33, the server is shown as continuing to receive 4 KB portions of data in its transmit buffer. At time point T34, the network switch forwards the remaining 4 KB of the data window and receives an additional 4 KB portion of data from the server. The server also receives another 4 KB portion of data for transmission to the network switch. Since the network switch has already transmitted the window of data to the client, the network switch port associated with the client computing device stops forwarding any more data to the client computing device.

At time point T35, the server computing device has already transmitted the window of data and the additional portion of data and thus, does not receive any additional data for transmission in its transmission buffer. Since the network switch has discontinued forwarding data to the client computing device, the data is accumulated in the network switch's switch port buffer, i.e. 8 KB is accumulated in this example. Meanwhile, the client computing device, having received the window of data, processes the data and transmits an acknowledgement packet (ACK) to the network switch.

At time point T37, the network switch, having seen the ACK from the client computing device, releases the stored amount of additional data from its switch port buffer and transmits a first 4 KB portion to the client computing device. In addition, the network switch forwards the ACK packet to the server computing device. The server computing device, in time point T38, having received the ACK packet, transmits the next 4 KB of the next window of data to the network switch. The network switch transmits the remaining 4 KB portion of the additional data for the previous window of data to the client computing device. The process then continues in a similar manner for the next window of data.

Figure 5:
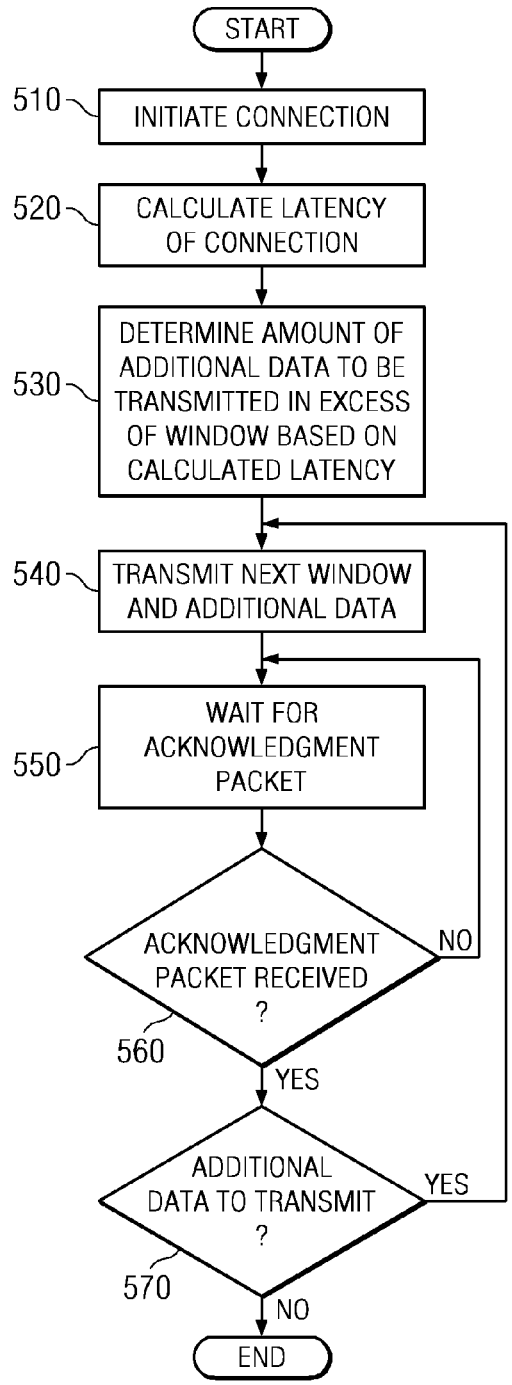
FIG. 5 is a flowchart outlining an exemplary operation for reducing idle time due to acknowledgement packet delay in accordance with one illustrative embodiment.

FIG. 5 is a flowchart outlining an exemplary operation of a sender computing device in accordance with one illustrative embodiment. As shown in FIG. 5, the operation starts by initiating a communication connection between the sender computing device and a receiver computing device (step 510). As part of this communication connection initiation, a window size for the transmission of data may be specified by the receiver computing device. A latency of the connection is calculated (step 520) and an amount of additional data to be transmitted in excess of the specified window size is determined based on the calculated latency (step 530). As mentioned above, this window size may vary over the lifetime of the connection and thus, it may be necessary to recalculate this amount of additional data when the window size changes. This may require that the logic in the LDADD engine 314, for example, monitoring the window size field of TCP packets received to determine if the window size has changed. If the window size has changed, then the LDADD engine 314 may perform the operation of step 530, and the operations thereafter for the remaining portions of data to be transmitted over the connection until a next change in window size is determined to have occurred.

After determining the additional amount of data to be transmitted, the sender computing device transmits the next window of data and the additional amount of data (step 540). The sender computing device then waits for an acknowledgement packet to be received (step 550). A determination is made as to whether an acknowledgement packet is received or not (step 560). If an acknowledgement packet has not been received, then the operation returns to step 550. If an acknowledgement packet is received, a determination is made as to whether there is additional data in the transmit buffers for transmission to the receiver computing device (step 570). If so, the operation returns to step 540. Otherwise, if there is no additional data to be transmitted, then the operation terminates.

Figure 6:
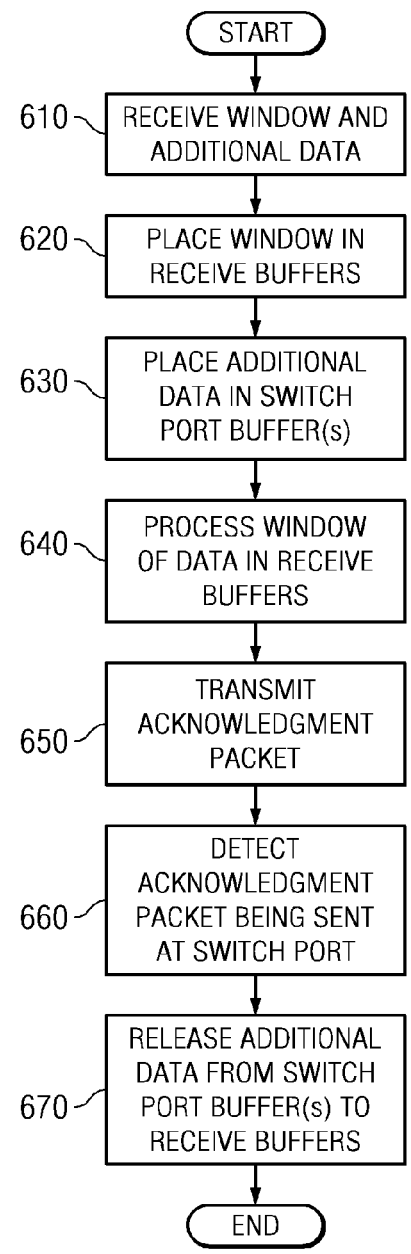
FIG. 6 is a flowchart outlining an exemplary operation of a receiver computing device in accordance with one illustrative embodiment.

FIG. 6 is a flowchart outlining an exemplary operation of a receiver computing device in accordance with one illustrative embodiment. As shown in FIG. 6, the operation starts with receiving a window of data and an additional portion of data from a sender computing device (step 610). The window of data is placed in the receive buffer of the receiver computing device (step 620) while the additional data is placed in one or more buffers of a switch port (step 630). The window of data is processed (step 640) and an acknowledgement packet is generated and transmitted (step 650). The switch port detects the acknowledgement packet being sent (step 660) and releases the additional data from the switch port buffer(s) to the receive buffers of the receiver computing device (step 670). The operation then terminates.

Thus, the illustrative embodiments provide mechanisms for minimizing the idle time associated with waiting for acknowledgement packets from a receiver computing device and waiting for additional data to be transmitted from a sender computing device. The mechanisms of the illustrative embodiments thus, reduce the number of wasted processor cycles due to waiting for an opportunity to send additional data or waiting for the additional data to be sent. As a result, the transmission and reception of data may be made virtually continuous with minimal delay between the transmission/reception of portions of data.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for communicating data between a sender computing device and a receiver computing device, comprising:
    determining a first amount of data corresponding to a window size for a communication connection between the sender computing device and the receiver computing device, wherein the window size specifies an amount of data that is to be transmitted from the sender computing device before waiting for receipt of an acknowledgement packet from the receiver computing device;
    calculating a second amount of data in excess of the first amount of data to be transmitted with the first amount of data from the sender computing device to the receiver computing device; and
    transmitting the first amount of data and second amount of data from the sender computing device to the receiver computing device, wherein the first amount of data is provided to the receiver computing device in at least one receive buffer of the receiver computing device, and wherein the second amount of data is maintained in at least one switch port buffer of a switch port without being provided to the at least one receive buffer of the receiver computing device.

2. The method of claim 1, further comprising:
    determining a latency of the communication connection between the sender computing device and the receiver computing device.

3. The method of claim 2, wherein the second amount of data is calculated based on the window size and the latency of the communication connection.

4. The method of claim 1, further comprising:
    transmitting the second amount of data from the at least one switch port buffer to the at least one receive buffer of the receiver computing device in response to the switch port detecting an acknowledgement packet being sent from the receiver computing device.

5. The method of claim 4, wherein the second amount of data is transmitted from the at least one switch port buffer to the at least one receive buffer of the receiver computing device at substantially a same time as the acknowledgement packet is transmitted to the sender computing device.

6. The method of claim 1, wherein the switch port and the switch port buffer are present in a separate network switch device from the sender computing device and the receiver computing device.

7. A method, in a network switch, for communicating data between a sender computing device and a receiver computing device, comprising:
    receiving a first amount of data corresponding to a window size for a communication connection between the sender computing device and the receiver computing device, wherein the window size specifies an amount of data that is to be transmitted from the sender computing device before waiting for receipt of an acknowledgement packet from the receiver computing device;
    receiving a second amount of data, in excess of the first amount of data, from the sender computing device;
    transmitting the first amount of data to the receiver computing device;
    storing the second amount of data in at least one switch port buffer of the network switch without transmitting the second amount of data to the receiver computing device;
    receiving an acknowledgement packet from the receiver computing device, the acknowledgement packet acknowledging receipt of the first amount of data; and
    in response to receiving the acknowledgement packet from the receiver computing device, transmitting the second amount of data from the at least one switch port buffer to the receiver computing device.

8. The method of claim 7, wherein the second amount of data is an amount of data calculated based on a latency of the communication connection between the sender computing device and the receiver computing device.

9. The method of claim 8, wherein the second amount of data is an amount of data calculated based on the window size, bandwidth of the communication connection, and the latency of the communication connection.

10. The method of claim 7, further comprising:
    transmitting the acknowledgement packet to the sender computing device at substantially a same time as transmitting the second amount of data from the at least one switch port buffer to the receiver computing device.

11. A computer program product comprising a non-transitory computer readable medium having a computer readable program recorded thereon, wherein the computer readable program, when executed on a computing device, causes the computing device to:
    determine a first amount of data corresponding to a window size for a communication connection between the sender computing device and the receiver computing device, wherein the window size specifies an amount of data that is to be transmitted from the sender computing device before waiting for receipt of an acknowledgement packet from the receiver computing device;
    calculate a second amount of data in excess of the first amount of data to be transmitted with the first amount of data from the sender computing device to the receiver computing device; and
    transmit the first amount of data and second amount of data from the sender computing device to the receiver computing device, wherein the first amount of data is provided to the receiver computing device in at least one receive buffer of the receiver computing device, and wherein the second amount of data is maintained in at least one switch port buffer of a switch port without being provided to the at least one receive buffer of the receiver computing device.

12. The computer program product of claim 11, wherein the computer readable program further causes the computing device to:
determine a latency of the communication connection between the sender computing device and the receiver computing device.

13. The computer program product of claim 12, wherein the second amount of data is calculated based on the window size and the latency of the communication connection.

14. The computer program product of claim 11, wherein the computer readable program further causes the computing device to:
transmit the second amount of data from the at least one switch port buffer to the at least one receive buffer of the receiver computing device in response to the switch port detecting an acknowledgement packet being sent from the receiver computing device.

15. The computer program product of claim 14, wherein the second amount of data is transmitted from the at least one switch port buffer to the at least one receive buffer of the receiver computing device at substantially a same time as the acknowledgement packet is transmitted to the sender computing device.

16. The computer program product of claim 11, wherein the switch port and the switch port buffer are present in a separate network switch device from the sender computing device and the receiver computing device.

17. A computer program product comprising a non-transitory computer readable medium having a computer readable program recorded thereon, wherein the computer readable program, when executed on a network switch device, causes the network switch device to:
receive a first amount of data corresponding to a window size for a communication connection between the sender computing device and the receiver computing device, wherein the window size specifies an amount of data that is to be transmitted from the sender computing device before waiting for receipt of an acknowledgement packet from the receiver computing device;
receive a second amount of data, in excess of the first amount of data, from the sender computing device;
transmit the first amount of data to the receiver computing device;
store the second amount of data in at least one switch port buffer of the network switch without transmitting the second amount of data to the receiver computing device;
receive an acknowledgement packet from the receiver computing device, the acknowledgement packet acknowledging receipt of the first amount of data; and
in response to receiving the acknowledgement packet from the receiver computing device, transmit the second amount of data from the at least one switch port buffer to the receiver computing device.

18. The computer program product of claim 17, wherein the second amount of data is an amount of data calculated based on a latency of the communication connection between the sender computing device and the receiver computing device.

19. The computer program product of claim 18, wherein the second amount of data is an amount of data calculated based on the window size, bandwidth of the communication connection, and the latency of the communication connection.

20. The computer program product of claim 17, wherein the computer readable program further causes the network switch device to:
transmit the acknowledgement packet to the sender computing device at substantially a same time as transmitting the second amount of data from the at least one switch port buffer to the receiver computing device.

21. A network switch device, comprising:
a network switch port buffer; and
network switch port logic coupled to the network switch port buffer, wherein the network switch port buffer:
receives a first amount of data corresponding to a window size for a communication connection between the sender computing device and the receiver computing device, wherein the window size specifies an amount of data that is to be transmitted from the sender computing device before waiting for receipt of an acknowledgement packet from the receiver computing device; and
receives a second amount of data, in excess of the first amount of data, from the sender computing device, and wherein the network switch port logic:
transmits the first amount of data to the receiver computing device;
stores the second amount of data in at least one switch port buffer of the network switch without transmitting the second amount of data to the receiver computing device;
receives an acknowledgement packet from the receiver computing device, the acknowledgement packet acknowledging receipt of the first amount of data; and
in response to receiving the acknowledgement packet from the receiver computing device, transmits the second amount of data from the at least one switch port buffer to the receiver computing device.

22. The network switch device of claim 21, wherein the second amount of data is an amount of data calculated based on a latency of the communication connection between the sender computing device and the receiver computing device.

23. The network switch device of claim 22, wherein the second amount of data is an amount of data calculated based on the window size, bandwidth of the communication connection, and the latency of the communication connection.

24. The network switch device of claim 21, wherein the network switch port logic further transmits the acknowledgement packet to the sender computing device at substantially a same time as transmitting the second amount of data from the at least one switch port buffer to the receiver computing device.

* * * * *